US010071654B2

(12) United States Patent
Mclean, Jr. et al.

(10) Patent No.: US 10,071,654 B2
(45) Date of Patent: Sep. 11, 2018

(54) BABY ALERT CAR SEAT ALARM—SMART CAR SEAT

(71) Applicants: James Edward Mclean, Jr., Charlotte, NC (US); Edward D. Mclean, San Marcos, TX (US)

(72) Inventors: James Edward Mclean, Jr., Charlotte, NC (US); Edward D. Mclean, San Marcos, TX (US)

(73) Assignee: Mcleanics Technology Corporation, Charlotte, NC (US)

( * ) Notice: Subject to any disclaimer, the term of this patent is extended or adjusted under 35 U.S.C. 154(b) by 0 days.

(21) Appl. No.: 14/756,722

(22) Filed: Oct. 5, 2015

(65) Prior Publication Data

US 2017/0096080 A1   Apr. 6, 2017

(51) Int. Cl.
*G08B 23/00* (2006.01)
*B60N 2/00* (2006.01)
*B60N 2/26* (2006.01)
*B60N 2/90* (2018.01)

(52) U.S. Cl.
CPC ............. *B60N 2/002* (2013.01); *B60N 2/26* (2013.01); *B60N 2/90* (2018.02); *B60N 2002/981* (2018.02)

(58) Field of Classification Search
CPC . B60N 2/002; B60N 2/26; B60N 2/44; B60N 2002/4485
See application file for complete search history.

(56) References Cited

U.S. PATENT DOCUMENTS

| 4,979,777 | A | * | 12/1990 | Takada | B60N 2/2839 297/250.1 |
| 5,474,327 | A | * | 12/1995 | Schousek | B60R 21/01516 180/268 |
| 5,605,348 | A | * | 2/1997 | Blackburn | B60N 2/2806 180/273 |
| 5,739,746 | A | * | 4/1998 | Shaffer | B60N 2/002 340/425.5 |
| 5,783,871 | A | * | 7/1998 | LeMense | B60N 2/002 180/282 |
| 5,790,031 | A | * | 8/1998 | Shelton | B60R 21/01556 180/273 |
| 5,941,560 | A | * | 8/1999 | Wolfram | B60N 2/002 180/271 |
| 5,949,340 | A | * | 9/1999 | Rossi | B60N 2/002 340/425.5 |
| 6,161,439 | A | * | 12/2000 | Stanley | B60N 2/002 280/735 |
| 6,266,592 | B1 | * | 7/2001 | LeMense | B60N 2/0276 180/271 |

(Continued)

*Primary Examiner* — Quang D Pham

(57) ABSTRACT

The Baby Alert Car Seat Alarm—Smart Car Seat, is a device or smart car seat that detects the presence of a baby or child placed, or secured in a car seat, within the vehicle, before and after the driver of the vehicle has reached his/her destination; and, after the ignition is turned off, alerts the driver of the vehicle that the baby or child remains place or secured in a car seat within the vehicle; or, once the baby or child is placed, or secured in a car seat, within the vehicle, if the ignition is not turned on within a preset time, the Baby Alert Car Seat Alarm—Smart Car Seat will alert the driver of the vehicle that a baby or child remains placed or secured in a car seat within the vehicle.

5 Claims, 11 Drawing Sheets

BLOCK DIAGRAM

(56) References Cited

U.S. PATENT DOCUMENTS

| | | | | |
|---|---|---|---|---|
| 6,357,790 B1* | 3/2002 | Swann | B60R 21/01532 | 280/735 |
| 6,812,844 B1* | 11/2004 | Burgess | B60N 2/002 | 180/273 |
| 7,039,207 B1* | 5/2006 | Elrod | A47C 7/72 | 297/217.3 |
| 7,348,880 B2* | 3/2008 | Hules | B60R 25/1004 | 340/425.5 |
| 7,592,905 B2* | 9/2009 | Barton | B60N 2/002 | 340/425.5 |
| 8,007,043 B1* | 8/2011 | Vuong | B60N 2/28 | 297/217.3 |
| 8,063,788 B1* | 11/2011 | Morningstar | B60N 2/002 | 180/271 |
| 8,892,302 B1* | 11/2014 | McDonald | G08B 21/24 | 701/36 |
| 9,189,943 B1* | 11/2015 | Rambadt | G08B 21/0266 | |
| 9,403,437 B1* | 8/2016 | McDonald | B60K 37/02 | |
| 2002/0129986 A1* | 9/2002 | Aoki | B60R 21/01546 | 180/268 |
| 2003/0122662 A1* | 7/2003 | Quinonez | B60N 2/002 | 340/457 |
| 2003/0222775 A1* | 12/2003 | Rackham | B60R 25/1004 | 340/457 |
| 2004/0113634 A1* | 6/2004 | Stanley | B60N 2/002 | 324/661 |
| 2004/0155515 A1* | 8/2004 | Verbovszky | A47D 15/006 | 297/488 |
| 2005/0023810 A1* | 2/2005 | Basir | B60R 21/01532 | 280/735 |
| 2005/0082103 A1* | 4/2005 | Garcia, Jr. | B60N 2/002 | 180/272 |
| 2005/0151401 A1* | 7/2005 | Evans | B60N 2/26 | 297/250.1 |
| 2005/0215845 A1* | 9/2005 | Mahony | A61B 5/02055 | 600/22 |
| 2005/0275276 A1* | 12/2005 | Patterson | B60N 2/2806 | 297/479 |
| 2006/0049929 A1* | 3/2006 | Lawrence | B60N 2/002 | 340/457 |
| 2006/0103516 A1* | 5/2006 | Zang | B60N 2/002 | 340/457 |
| 2006/0111821 A1* | 5/2006 | Wallner | B60N 2/2806 | 340/573.1 |
| 2006/0208911 A1* | 9/2006 | Davis | B60N 2/002 | 340/573.4 |
| 2007/0055428 A1* | 3/2007 | Kong | G06K 9/00369 | 701/45 |
| 2008/0167806 A1* | 7/2008 | Wheeler | G01C 21/26 | 701/532 |
| 2009/0131185 A1* | 5/2009 | Speedie | A47D 9/02 | 472/119 |
| 2009/0152918 A1* | 6/2009 | Yumoto | B60N 2/2806 | 297/219.12 |
| 2009/0167067 A1* | 7/2009 | Decoster | B60R 21/01556 | 297/217.1 |
| 2009/0212955 A1* | 8/2009 | Schoenberg | B60N 2/002 | 340/573.1 |
| 2009/0234542 A1* | 9/2009 | Orlewski | B60N 2/002 | 701/45 |
| 2010/0019547 A1* | 1/2010 | Gray | B60N 2/2821 | 297/118 |
| 2010/0052373 A1* | 3/2010 | Kono | A47D 9/02 | 297/130 |
| 2010/0138113 A1* | 6/2010 | Lee | B60Q 9/00 | 701/45 |
| 2010/0253498 A1* | 10/2010 | Rork | B60N 2/002 | 340/457.1 |
| 2011/0205060 A1* | 8/2011 | Taylor | G08B 21/22 | 340/573.1 |
| 2012/0232749 A1* | 9/2012 | Schoenberg | B60N 2/002 | 701/36 |
| 2012/0268265 A1* | 10/2012 | Morley | B60N 2/002 | 340/457 |
| 2013/0049955 A1* | 2/2013 | Hoover | B60N 2/002 | 340/539.11 |
| 2013/0201013 A1* | 8/2013 | Schoenberg | B60R 22/48 | 340/438 |
| 2014/0253313 A1* | 9/2014 | Schoenberg | B60N 2/28 | 340/457 |
| 2014/0253314 A1* | 9/2014 | Rambadt | B60N 2/002 | 340/457.1 |
| 2014/0266694 A1* | 9/2014 | McCluskey | G08B 21/0453 | 340/539.12 |
| 2014/0277935 A1* | 9/2014 | Daman | G08G 1/127 | 701/36 |
| 2014/0353049 A1* | 12/2014 | Vidal | G01G 23/18 | 177/25.13 |
| 2014/0361889 A1* | 12/2014 | Wall, II | G08B 21/025 | 340/539.11 |
| 2015/0130604 A1* | 5/2015 | Gomez Collazo | B60N 2/002 | 340/457 |
| 2015/0291065 A1* | 10/2015 | Renaudin | B60N 2/002 | 297/216.11 |
| 2015/0332578 A1* | 11/2015 | Borgne | B60N 2/26 | 340/667 |
| 2016/0078737 A1* | 3/2016 | Cohen | G08B 21/0205 | 340/457 |

* cited by examiner

SIDE VIEW

3-D VIEW OF THE BACSA

Rear-side view

Microprocessor based schematic diagram

BABY ALERT CAR SEAT ALARM—SMART CAR SEAT

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF INVENTION

The Baby Alert Car Seat Alarm—Smart Car Seat, is in the field of Car Seats and Automobile Security Devices. As of today, we have automobiles that provide protection for the driver and the passengers in many ways. We have seat beats that secure the driver and passengers inside of the vehicle in the event of a crash. We have seat beat alarms that alert the driver in the event a seat beat is not properly secured in place. We have air bags that protect the driver and front side passenger in the event of a crash, and air bag systems which warn the driver that an air bag system is in place and activated. There are alarms that sound to warn us when we accidentally leave our keys in the ignition, leave our door ajar, when we are low in fuel, when we need an oil change, when our engine needs checked, etc. However, all of these safety features and warning systems lack one small, but very important feature, none of them warn us when a baby or child is secured in a car seat and abandoned in a vehicle; nor does these current systems warn us when a baby, child or person is present in a vehicle when the internal temperature of the vehicle has reached a dangerously high level.

Each year, a baby or child is accidentally abandoned in a vehicle, and in some cases, the baby or child dies as a result of it. Most of these children were secured in a car seat, and the driver of the vehicle simply forgot that the baby or child was in the vehicle when reaching his/her destination. After such a tragedy, the parents of the victim children are devastated by the lost of their child. It is said that on a normal day's temperature of 80 degrees, the inside temperature of a vehicle will reach 90 degrees in approximately 10 minutes of closure, 114 degrees in approximately 30 minutes, and 123 degrees in approximately 60 minutes of closure. And, a child's body warms 3-5 times that of an adult's body. Therefore, an outside temperature of 70 degrees or more will expose a baby or child abandoned inside an enclosed vehicle to a heat stroke.

As humans, we are subject to accidentally forgetting things. We forget where we last placed our TV remote, our car keys, wallet or purse, etc. A father who normally doesn't take the child to the day care in the mornings, may be so concerned with getting to work on time that he completely forgets that he has the child with him secured in a car seat in the vehicle. He may enter his office, and suddenly remember that he has abandoned his child in the vehicle secured in a car seat, truly this would save the day; however, if he fails to remember that he has abandoned his child in the vehicle secured in a car seat, this father may be faced with a tragedy that will remain with him for the rest of his life.

BRIEF SUMMARY OF THE INVENTION

The Baby Alert Car Seat Alarm—Smart Car Seat (BACSA-Smart Car Seat), is the solution to the problem. The BACSA-Smart Car Seat is an electronic device, and/or Smart Car Seat that converts from a car seat to a stroller/baby carrier, designed to sense the presence of a baby or child placed, or secured in a car seat, within the vehicle; and alerts the driver of the vehicle that a baby or child is placed, or secured in a car seat, within the vehicle once the driver has reached his/her destination. This is accomplished by a force sensing resistor (FSR), or other type of sensors, except for a vicinity motion sensor, placed under the padding of the car seat, vehicle's seats, or on some internal part of the vehicle. This sensor senses the presence of the baby or child and sends a signal to a control circuit, the control circuit then sends a signal to an alerting device to alert the driver of the vehicle that a baby or child is still placed, or secured in a car seat, within the vehicle.

Figure 1:
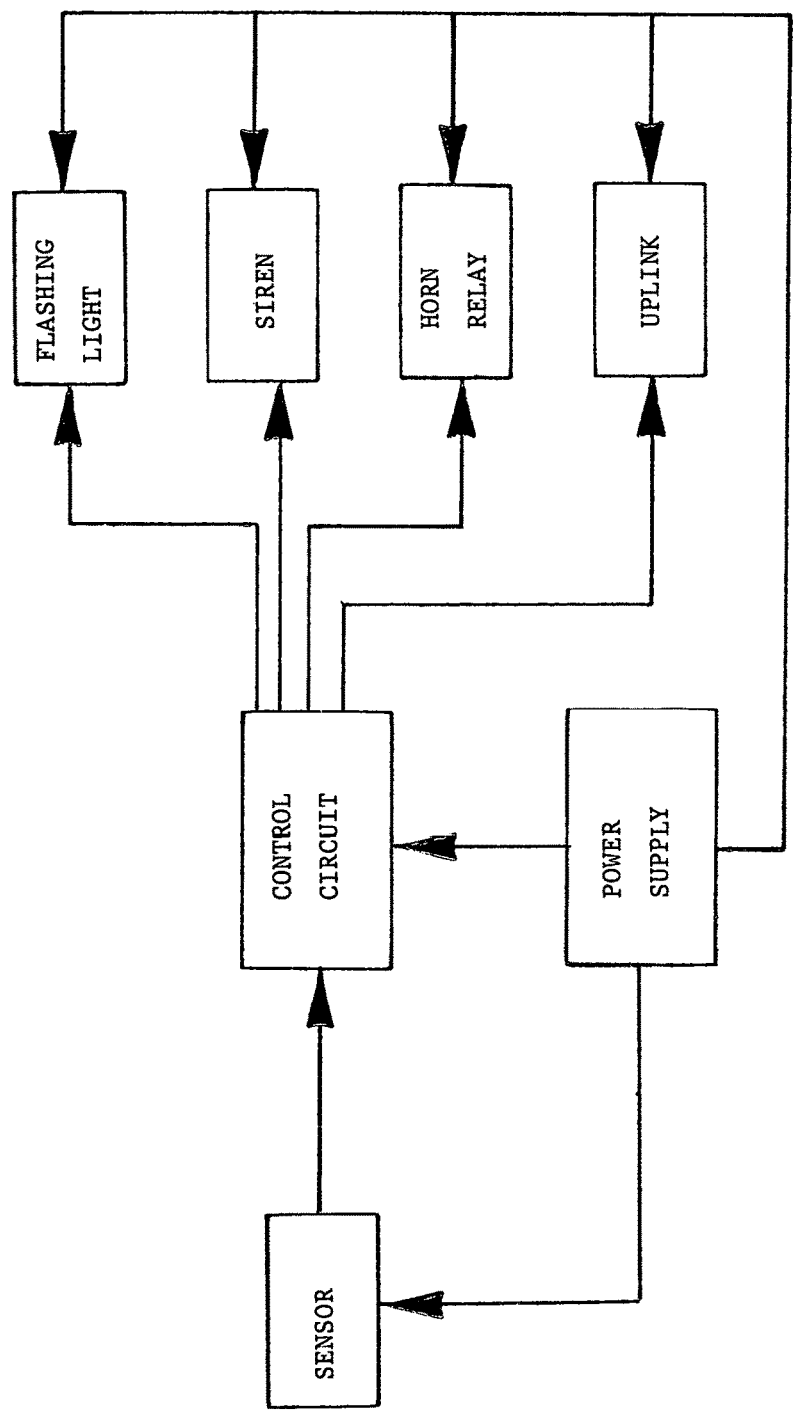
FIG. 1, is a block diagram of the invention.
Figure 2:
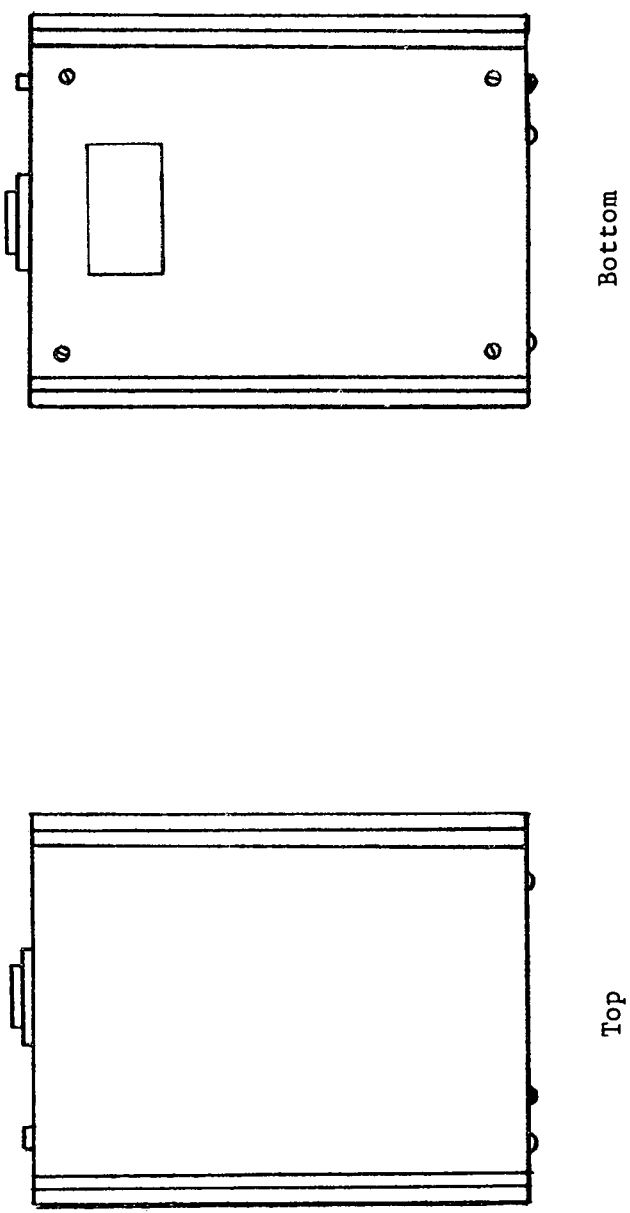
FIG. 2, is the top and bottom view of the invention.
Figure 3:
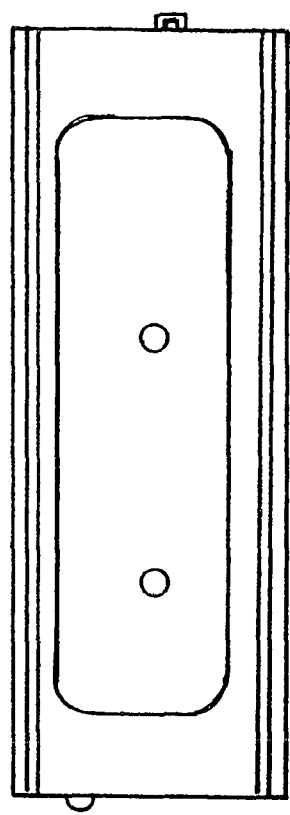
FIG. 3, is the side view of the invention.
Figure 4:
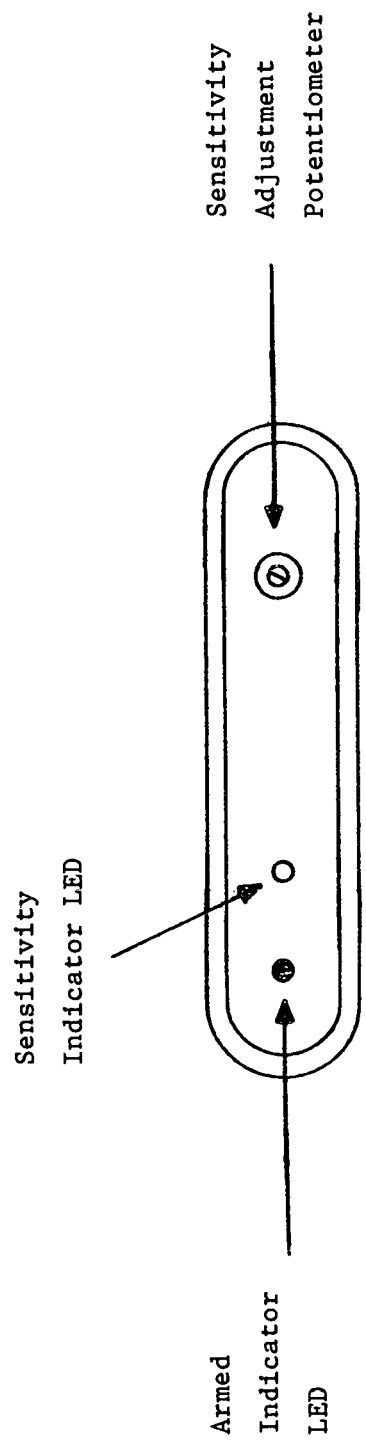
FIG. 4, is the front view of the invention.
Figure 5:
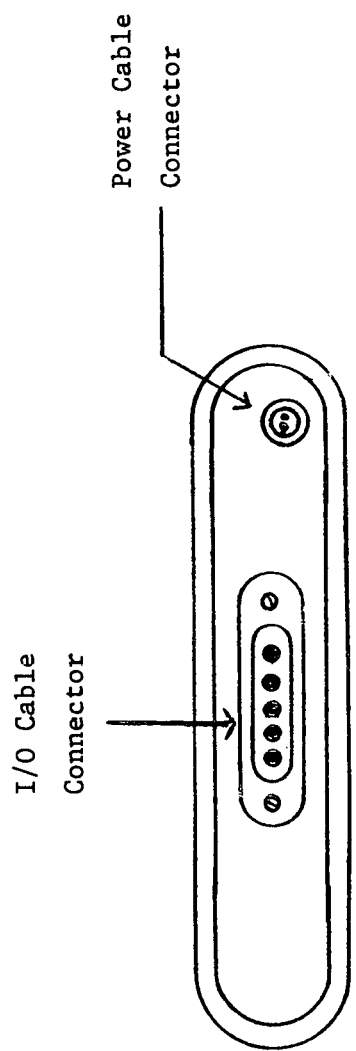
FIG. 5, is the rear view of the invention.
Figure 6:
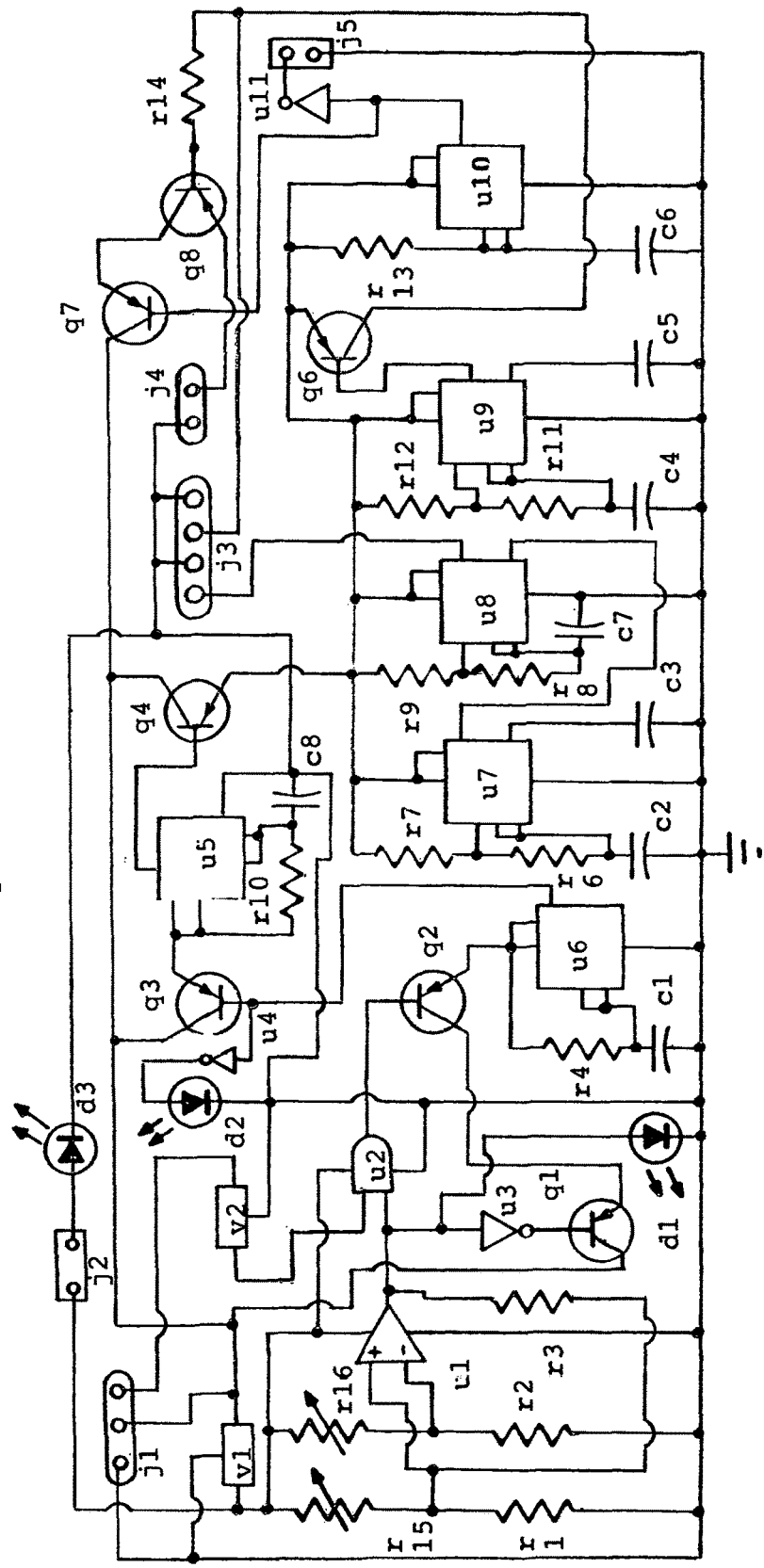
FIG. 6, is the schematic diagram of the invention.
Figure 7:
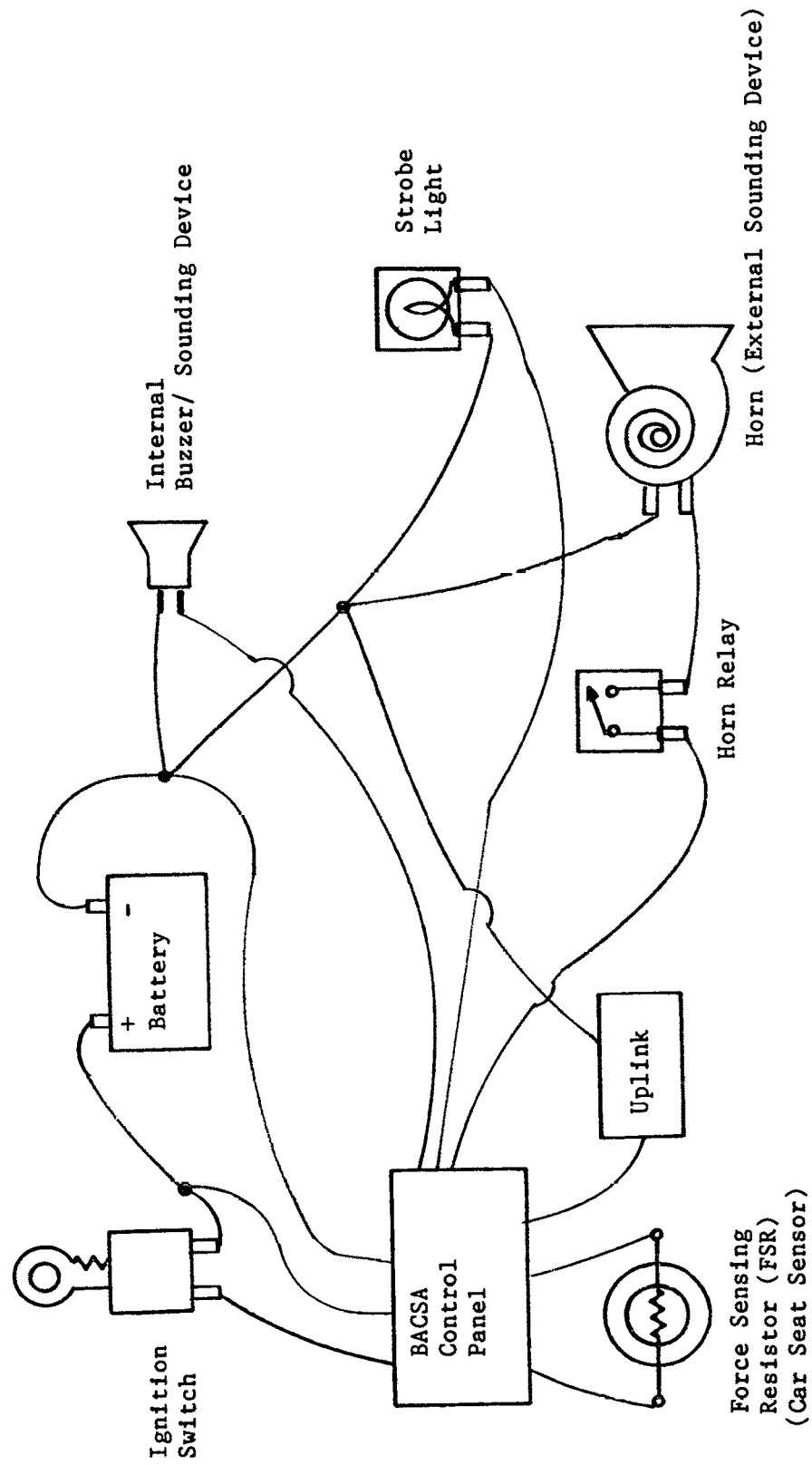
FIG. 7, is the wiring diagram of the invention.
Figure 8:
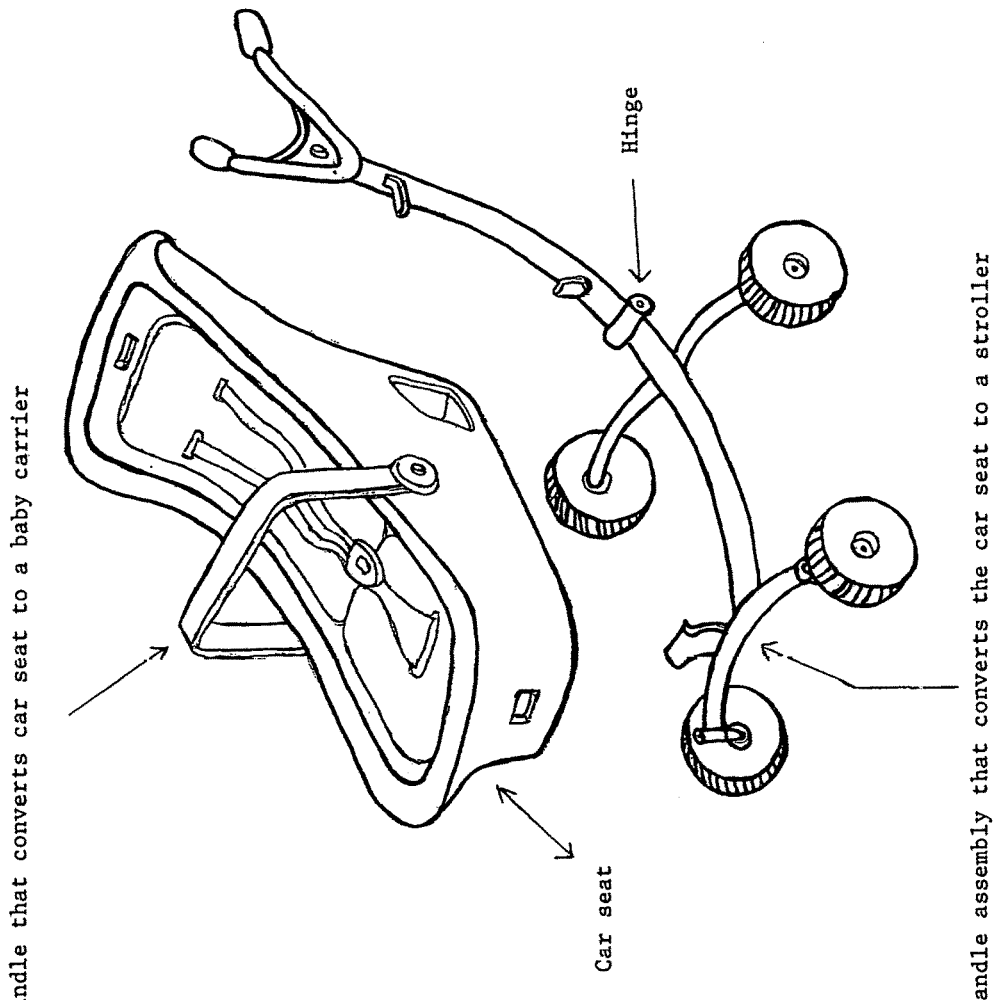
FIG. 8, is the 3D view of the convertible car seat/stroller/baby carrier.
Figure 9:
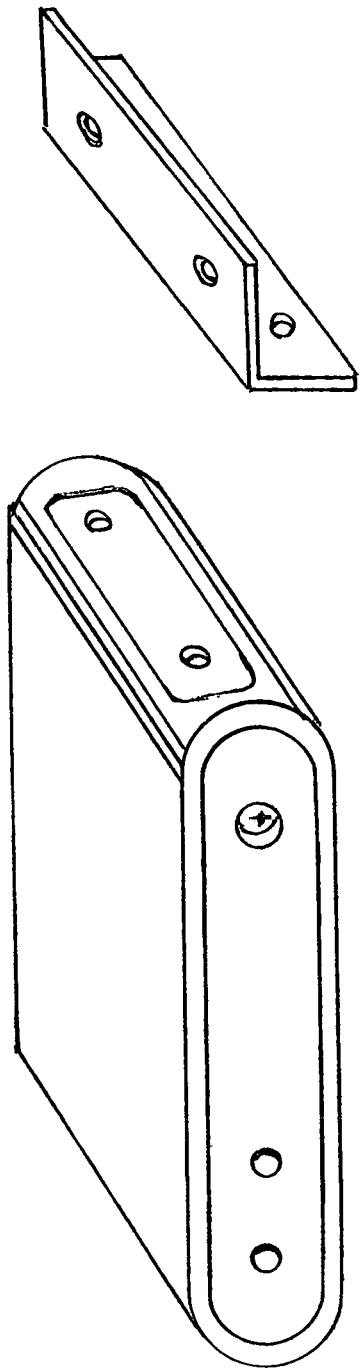
FIG. 9, is the 3D view of the invention.
Figure 10:
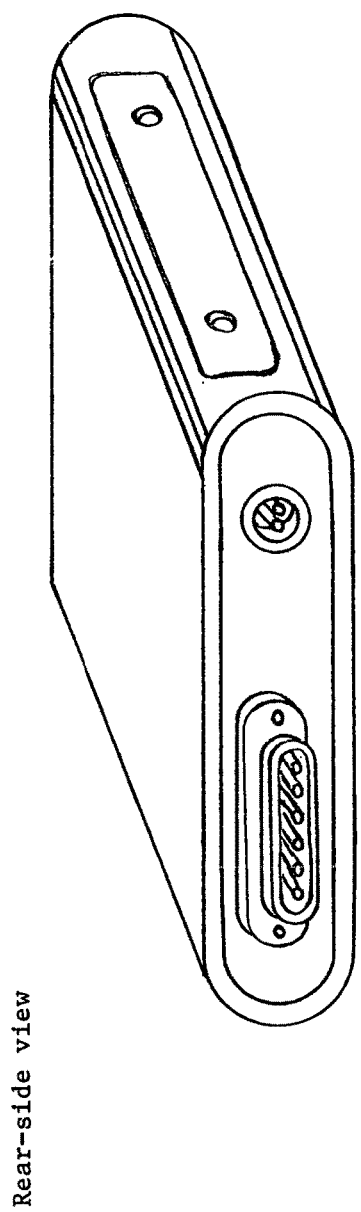
FIG. 10, is the 3D view of the invention.

Symbols in FIG. 6,
$c_1, c_2, c_3, c_4, c_5, c_6, c_7$, and $c_8$=Capacitors.
$d_1, d_2$, and $d_3$=Light Emitting Diode (LEDs).
$v_1$ and $v_2$=Voltage Regulators.
$j_1, j_2, j_3, j_4$, and $j_5$=Jacks/Connectors.
$u_1$=Comparator/Op Amp, and $u_2$=And Gate.
$u_5, u_6, u_7, u_8, u_9$, and $u_{10}$=555 Timers.
$r_1, r_2, r_3, r_4, r_6, r_7, r_8, r_9, r_{10}, r_{11}, r_{12}, r_{13}$, and $r_{14}$=Resistors.
$r_{15}$=Force Sensing Resistor (FSR), and $r_{16}$=Potentiometer (Pot).
$q_1, q_2, q_3, q_4, q_6, q_7$, and $q_8$=Transistors.
$u_3, u_4$, and $u_{11}$=Inverters.

Figure 11:
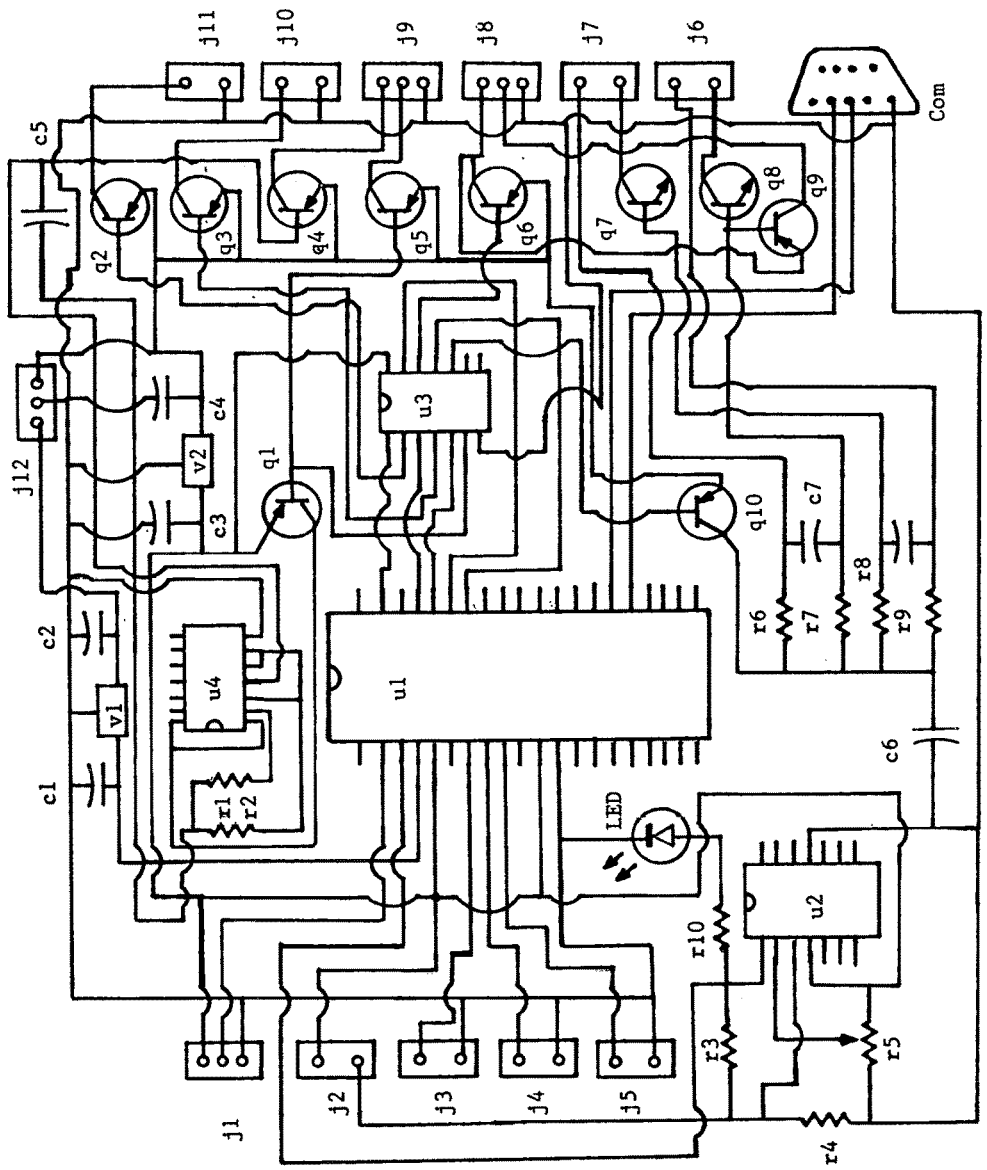
FIG. 11, is the microprocessor based schematic diagram of the invention.

Symbols in FIG. 11,
$c_1, c_2, c_3, c_4, c_5, c_6, c_7$, and $c_8$=Capacitors.
$r_1, r_2, r_3, r_4, r_5, r_6, r_7, r_8, r_9$, and $r_{10}$=Resistors.
$j_1, j_2, j_3, j_4, j_5, j_6, j_7, j_8, j_9, j_{10}, j_{11}$, and $j_{12}$=Jack/Connectors.
$u_1$=Microprocessor, $u_2$=Op Amp, $u_3$=Inverter, $u_4$=And Gate.
$q_1, q_2, q_3, q_4, q_5, q_6, q_7, q_8, q_9$, and $q_{10}$=Transistors.
Com=Communication Port, LED=Light Emitting Diode.

DETAILED DESCRIPTION OF THE INVENTION

The Baby Alert Car Seat Alarm—Smart Car Seat (BACSA-Smart Car Seat) is an electronics device, and/or Smart Car Seat that converts from a Car Seat to a Baby Carrier or Stroller, designed to sense the presence of a baby or child placed, or secured in a car seat, within a vehicle; and alerts the driver of the vehicle that a baby or child is placed, or secured in a car seat, within the vehicle, once the vehicle has stopped, the engine turned off, and the key is removed from the ignition.

This is accomplished by a Force Sensing Resistor (FSR) installed under the padding of the car seat, vehicle seats, or on some interior part of the vehicle. This FSR does not sense "vicinity motion" such as the "vicinity motion" of other devices; however, once the baby or child is placed, or secured in a car seat, within the vehicle, the FSR senses the presence of the baby or child by lowering or increasing its resistance; thus, allowing a small current signal to either increase or decrease in magnitude, which is inversely proportional to the voltage across the terminals of the FSR; therefore, the FSR's voltage output will either increase or decrease in magnitude.

Once the FSR senses the presence of a baby or child placed, or secured in a car seat, within the vehicle, a voltage or current signal is sent to an electronic control circuit (solid state or microprocessor based). Once the control circuit receives the FSR's signal and the car ignition is turned on, the control circuit will activate. If the car ignition is not turned on within three minutes (or a predetermined set time), the control circuit will automatically activate.

If the ignition is not turned on within 10 minutes (or a predetermined set time), the control circuit will flash one or more internal lights and sound an internal alarm (buzzer, beeper, siren, voice speech, message, or any other sounding/alerting device) to alert the driver of the vehicle that a baby or child is placed, or secured in a car seat, within the vehicle.

Once the FSR senses the presence of a baby or child place, or secured in a car seat, within a vehicle, and the ignition is turn on, and the driver has traveled to his/her destination, and then turn off the ignition, the control circuit will alert the driver that a baby or child is place, or secured in a car seat, within the vehicle by activating an internal flashing light and sounding device. Then, after five minutes (or a predetermined set time), if the baby or child is still present in a car seat, or within the vehicle, the control circuit will sound an external alarm; this is accomplished by the control circuit sending a signal to a siren that is mounted under the hood to produce a sound outside of the vehicle, or the control circuit can send a signal to the vehicle's horn relay to produce the outside sound/alarm.

Further, the control circuit can cause a signal to be transmitted to a remote device such as, a key chain receiver, pendant receiver, bracelet receiver, or any other remote receiving device (cell phone, tablet, laptop, etc.).

If all else is ignored, the control circuit can be interfaced with an outside monitoring service. This monitoring service would receive an uplinked or transmitted signal indicating that a baby or child is placed, or secured in a car seat, within a vehicle, and the monitoring service can notify the proper authorities.

If at any time during the sensing, alarming/alerting stage of the BACSA—Smart Car Seat's control circuit, the baby or child is removed from the car seat, or vehicle, the alarming and alerting state would be discontinued and the device reset.

Further, the BACSA—Smart Car Seat can sense a baby, child, or person, secured or unsecured in a vehicle, when the internal temperature of that vehicle reaches a preset dangerous level. Once the dangerous temperature level is sensed, the control circuit will instantly trigger an internal alarm or alerting device (flashing lights, sound, or any other alerting device); this is accomplished by a passive infrared sensor and a temperature sensor, and/or any other sensor, except for a "vicinity motion sensor", attached to the car seat or internal part of the vehicle. The sensor sends a signal to the control circuit where it is processed, then the control circuit triggers the alerting/alarming device to alert the individuals within the vehicle.

The primary sensor of the BACSA—Smart Car Seat is a Force Sensing Resistor (FSR) installed under the padding of the car seat, vehicle seats, or on an internal part of the vehicle. This FSR senses the force asserted on the car seat padding by the weight of the baby or child, then sends a signal to the control circuit for processing. In addition to using the FSR's signal to trigger an alarm or alerting device, the control circuit can use the FSR's signal to determine the baby's or child's weight, and can display the results on a Liquid Crystal Display Module (LCD Module), or any other displaying device for viewing.

The BACSA—Smart Car Seat may be equipped with a Passive Infrared Sensor (PIR) or Photo Cell Sensor (Cds) to sense the presence or entry of a baby, child, or person, secured or unsecured, within the vehicle; This is accomplished by the sensor(s) detecting the motion of the baby, child, or person (pets can be detected as well) within the vehicle, then sending a signal to the control circuit. Once the signal is received by the control circuit from the PIR or Cds sensor, the control circuit will check the internal temperature of the vehicle by way of an attached temperature sensor. If the internal temperature is equal to or greater than the preset dangerous temperature level of the control circuit, then the control circuit will trigger an internal alerting device (flashing Light, sound, or any other alerting device), to warn the individuals within the vehicle of the dangerous temperature conditions. If the vehicle's internal temperature is not cooled within a preset determined time after the first alarming/alerting and the vehicle is still occupied, then the control circuit will trigger an outside alerting/alarming sound, and a signal can be transmitted or uplinked to a remote device or monitoring service.

Further, the PIR and Cds sensors can monitor and detect the entry of a baby, child, or person, into the vehicle. The PIR sensor accomplishes this by sensing or detecting the motion of the vehicle's doors as they are opened or closed; and/or by sensing or detecting the motion of the baby or child while being placed within the vehicle, or secured within a car seat within the vehicle; and/or by sensing or detecting the motion of a person while entering or exiting the vehicle; pets' motion can be sensed or detected as well. The Photo Cell Sensor (Cds) senses the opening and closing of the vehicle's doors, and therefore, senses the entry or placement of a baby, child, or person, within the vehicle, by sensing the interior lights as they illuminate from the opening and closing of the vehicle's doors. Further, once the vehicle's doors are opened and the interior lights comes on and a baby or child is placed within the vehicle, or secured in a car seat within the vehicle, the Cds sensor will sense the change in the surrounding illumination of the interior lights due to the movement of individuals (baby, child, person, or pet) entering or exiting the vehicle. And, the PIR and Cds sensors can monitor the vehicle's doors and thereby, detect when a baby or child is placed within the vehicle, or secured within a car seat within the vehicle, because people must open the vehicle's doors to place a baby or child within the vehicle. The PIR and Cds sensors will also monitor all other points of entries into the vehicle.

Finally, for entertainment purposes, the BACSA—Smart Car Seat can sound certain musical tones to help relax an irritated baby or child. These musical tones are stored within the memory of the control circuit of the BACSA—Smart Car Seat.

In addition to monitoring, the control circuit of the BACSA—Smart Car Seat can be interfaced to a GPS device for tracking its location. And, the BACSA—Smart Car Seat can output the internal temperature of the vehicle to a liquid Crystal Display (LCD Module), cell phone, tablet, computer, laptop, or any other displaying or remote device.

The BACSA—Smart Car Seat can also sense the baby's or child's temperature, blood pressure, and pulse or heart rate; and display or transmit this data to a cell phone, tablet, computer, laptop, or any other remote device.

Each year, a baby or child is accidentally abandoned in a vehicle; and in some cases, the baby or child dies as a result of it; thereafter, leaving the parents of that baby or child devastated from the tragedy. The BACSA—Smart Car Seat can help to prevent such a tragedy from occurring.

We claim:

1. A device being installed in a vehicle, or incorporated within a car seat for detecting a presence of a baby or a child remains placed or secured in the vehicle, the device comprising:
   (a) a Primary sensor comprising at least one of a passive infrared sensor (PIR) and a photo cell sensor to detect an entry or exit of the baby or child through any points of entry of the vehicle;
   (b) A Secondary sensor comprising at least one of a Force Sensing Resistor (FSR) installed under a padding of the car seat, a vehicle seat, or on an internal part of the vehicle to detect the baby or child being placed or secured in the car seat within the vehicle;
   (c) a temperature sensor comprising at least one of a passive infrared sensor and a temperature sensor to detect an internal temperature of the vehicle;
   (d) a display;
   (e) a vehicle internal alerting device comprising at least one or more internal lights and an internal alarm;
   (f) a vehicle external alerting device;
   (g) a connection comprising at least one input/output jack/connector for connecting a GPS tracking device; and
   (h) a control circuit in communication with the primary sensor and the secondary sensor;
   wherein the control circuit is automatically activated once the control circuit receives a FSR signal and the vehicle ignition being turned on or if the vehicle ignition is not turned on within a first predetermined set time;
   wherein the control circuit is configured to activate a first alert via the vehicle internal alerting device by flashing the one or more internal lights and sounding the internal alarm if after the entry of the baby or the child and the vehicle ignition is not turned on within a second predetermined set time to alert the driver of the vehicle that the baby or the child is placed or secured in the car seat within the vehicle;
   wherein the control circuit is configured to active a second alert via the vehicle internal alerting device by flashing the one or more internal lights and sounding the internal alarm once the secondary sensor detects the baby or the child being placed or secured in the car seat within the vehicle and the vehicle ignition is turned on, the vehicle has travel to a destination, and the vehicle ignition is turned off;
   wherein the control circuit is configured to activate a third alert, via the vehicle external alerting device by sounding the vehicle external alerting device, after a third predetermined set time since the second alert and the secondary sensor is still sensing the presence of the baby or the child placed or secured in the car set within the vehicle;
   wherein the control circuit is configured to activate a fourth alert by flashing the one or more internal lights and sounding the internal alarm when the secondary sensor senses the presence of the baby or the child placed or secured in the car seat within the vehicle or when the primary sensor detects the entry of the baby or child within the vehicle and the internal temperature of the vehicle reaches a preset dangerous level;
   wherein the control circuit is configured to determine a weight of the baby or the child based on a magnitude of the FRS signal from the secondary sensor and display the baby or the child's weight via the display;
   wherein the control circuit is configured to discontinue the first alert, the second alert, the third alert, and the fourth alert and the device resets if the baby or the child is removed from the car seat; and
   wherein the control circuit is configured to transmit a signal to a remote device indicating the baby or the child is placed or secured in the car seat within the vehicle.

2. The device as outlined in claim 1, wherein the control circuit is configured to sound the internal alarm by use of a strobe light, siren, buzzer, voice speech, or message.

3. The device as outlined in claim 1, wherein the control circuit is further configured to output the internal temperature of the vehicle to a LCD module, cell phone, tablet, computer, or laptop.

4. The device as outlined in claim 1, wherein the control circuit is further configured to transmit the child or the baby's weigh to the remote device, a cell phone, tablet, computer, or laptop.

5. The device as outlined in claim 1, wherein the control circuit is further configured to transmit the baby or the child's blood pressure data to a cell phone, tablet, computer, or laptop.

* * * * *